United States Patent [19]

Schickedanz

[11] 4,410,761
[45] Oct. 18, 1983

[54] STEREO LOUDSPEAKER SYSTEM FOR A PICTURE REPRODUCING SCREEN

[76] Inventor: Willi Schickedanz, Langener Strasse 70, 6050 Offenbach am Main, Fed. Rep. of Germany

[21] Appl. No.: 202,832

[22] Filed: Nov. 5, 1980

[51] Int. Cl.³ .............................................. H04R 5/00
[52] U.S. Cl. .................................. 358/335; 358/198; 381/1; 381/2; 381/24
[58] Field of Search ............... 179/1 G, 1 GA, 1 E, 179/1 AT; 181/145, 155

[56] References Cited

U.S. PATENT DOCUMENTS

2,137,032  11/1938  Snow .................................. 179/1 G
3,056,854  10/1962  Katzenstein et al. .............. 179/1 G
3,680,936   8/1972  Backhaus ........................ 181/145 X
4,105,864   8/1978  Berkovitz ....................... 179/1 G X

*Primary Examiner*—R. J. Hickey
*Attorney, Agent, or Firm*—Arnold, White & Durkee

[57] ABSTRACT

A television system having a stereo loudspeaker system with a plurality of speakers and delay circuitry for successively delaying the left and right signals so that the speaker at the right end of the speaker arrangement receives the least delayed right signal and the most delayed left signal and the speaker at the left end of the speaker arrangement receives the least delayed left signal and the most delayed right signal.

20 Claims, 12 Drawing Figures

FIG.12

STEREO LOUDSPEAKER SYSTEM FOR A PICTURE REPRODUCING SCREEN

BACKGROUND OF THE INVENTION

1. Field of the Invention

This invention relates to a television set being capable of receiving and reproducing stereo sound.

More particularly, the invention relates to a television set comprising loudspeakers for reproducing a left channel sound signal and a right channel sound signal.

2. The Prior Art

Stereophonic listening to more than one sound reproducing source has been studied for many years (see: Jens Blauert: Räumliches Hören, Hirzel Verlag, Stuttgart, 1974, p. 161). A very important result of these researches was the finding that two sound sources are recognized as one sound source only, if the two sound signals were similar in phase and amplitude. This effect is called "Sum localisation". Another important finding was the so-called "Law of the first wave front" which means that only one out of two sound signals is recognized, if a time difference of about 1 Millisecond lies between two sound signals of similar levels or amplitudes. Differences in the transit time of more than one second will cause an echo-effect, if the amplitudes of two sound sources are similar. A variation of the level (H. D. Harwood "Stereophonic Image Sharpness", Wireless World, 1968, p. 207–210) as well as of the time difference of two sound signals has a mutual influence on the sound localisation or image position. In view of these experiments the best position for listening to two-channel stereo sound reproductions is between the two loudspeakers being capable of reproducing the left and right channel information, respectively. More specifically, the two loudspeakers and the listener should define the corners of an equilateral triangle (see: W. Baier: Rundum-Klang, radio-tv-electronic 1977, No. 12, p. 30,32, FIG. 1). If the distance from the listener to one of the two loudspeakers differs from the distance between the listener and the other loudspeaker, the stereo effect disappears in dependence upon the difference of the two distances. Thus, only a very small area in front of the two loudspeakers is suitable for a good stereo effect. This area is the smaller the smaller the so-called stereo basis is, i.e. the distance between the two loudspeakers.

In a television set comprising two loudspeakers, one being located at the left side of the television tube and the other being located at the right side of said tube, the stereo basis is very small, since television sets have a tube diameter of 30 to 70 cm only. Therefore, it is desirous to broaden the stereo area of a television set. Many proposals have been made in the art of radio stereophony to enlarge the stereo basis. One of those proposals concerns an electrostatic loudspeaker in a rectangular room, the diaphragm of this loudspeaker covering one wall of the room (P. J. Walker, Wide Range Electrostatic Loudspeakers, part 3—Complete Systems, Wireless World, August 1955, FIG. 6). Sound intensity throughout the room is independent of position. The apparent sound source is always in a direction perpendicular to the diaphragm and, of course, moves a the listener moves. The same loudspeaker may be used for stereophony. With transmission line matching and feeding the signal at one end the wavefront will be tilted, due to the time delay. Separate signals may be fed from either end to produce two tilted wavefronts, one for each signal. Since each apparent origin is perpendicular to its wavefront, the aspect angle from the listener is a constant and entirely independent of the listener's position over a large triangular area. The relativ intensity of the two signals is also constant. A similar principle using a plurality of electrodynamic loudspeakers instead of an electrostatic loudspeaker has recently been proposed (see: Verbesserung des Raumeindrucks durch Holophonie, Funkschau 1980, No. 5, p. 74–76). In this latter system, however, it is also made use of the fact that only frequencies of more than 300 Hz are useful for stereo location (see: K.de Boer, Plastische Klangwiedergabe, Philips Technische Rundschau, 1940, No. 5, p. 108–115). Consequently, only the frequencies above 300 Hz are led to a plurality of tweeters and midrange loudspeakers, whereas the lower frequencies are led to common woofers.

SUMMARY OF THE INVENTION

It is a general object of the invention to improve the stereo effect of a stereo television set.

More particularly, it is an object of the invention to broaden the area in which a good stereo effect can be achieved in view of the small stereo basis of a television set.

Another object of the invention is to provide an improved housing of a television set which is capable of receiving a loudspeaker system comprising signal delay means.

A concomitant object of the invention is to adapt prior art stereo improvements, e.g. the ambience-stereophony as described in German Offenlegungsschrift No. 28 06 914 or the pickup-room evaluating devices as described in German accepted Patent Application No. 23 55 943.

Still a further object of the invention is to mechanically broaden the stereo basis by an enlargement of the distance between loudspeaker means.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
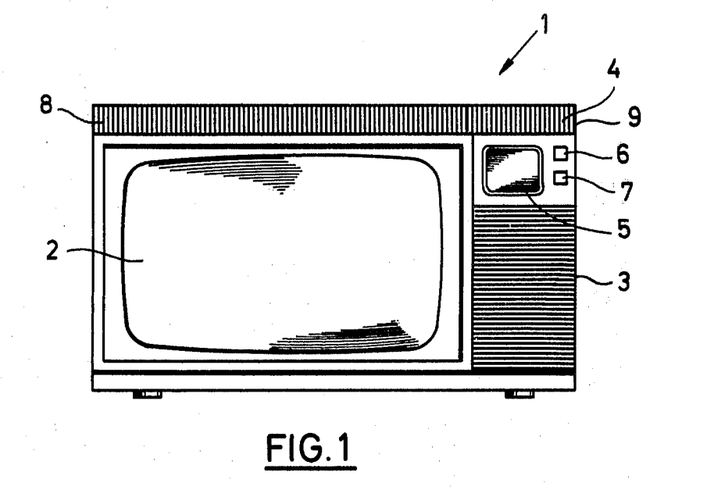
FIG. 1 is a television set having a conventional loudspeaker at the right side of the television tube and also having a lousspeaker arrangement above the television tube; and loudspeaker arrangement comprising a plurality of single loudspeakers.

Referring now to FIG. 1, the television set 1 depicted therein comprises a television tube 2, a mono loudspeaker housing 3 and a stereo loudspeaker housing 4. Above the mono loudspeaker housing 3 a remote control device 5 is provided which can be removed from the television set 1 and control the different functions by means of infrared or ultrasonic radiation. Two optical displays 6,7 are provided for the indication of the numbers of the selected tv channels as well as of the receipt of a stereo program. The loudspeaker arrangement housing 4 comprises a plurality of loudspeaker units being arranged from the left side 8 to the right side 9 of the housing 4. The loudspeaker arrangement housing 4 also includes delay means being capable of delaying the left channel audio signal as well as the right channel audio signal successively from one loudspeaker unit to another. The loudspeaker units can either be electrodynamic loudspeakers as described in Funkschau 1980, No. 5, p. 74–76 or an electrostatic loudspeaker as described in Wireless World, August 1955. Each loudspeaker unit is co-ordinated to a delay element, and it is also known in the art to co-ordinate an amplifier or an attenuator to each loudspeaker unit so as to control the loudness of each loudspeaker element individually. Assuming now that a television program with stereo sound is being received, the loudspeaker in the housing 3 reproduces a sum signal of the right and left stereo channel, i.e. a mono audio signal. This mono signal may either comprise all frequencies received by the tuner of the television set 1 or the lower frequencies only. "Lower frequencies" in the sense of the present invention means those frequencies which are not of importance with respect to the stereo effect. The stereo sound being emitted from the loudspeaker arrangement in the housing 4 is a combination of two wavefronts being inclined to each other. The wavefronts may have either a straight or an arcuated from. Thus, the area in which stereo sound can be received by a listener is broadened. By locating the housing 4 of the loudspeaker arrangement above or below the television tube 2, what is very essential in view of the present invention, the sound will always correspond exactly to the picture displayed on the tube 2. Moreover, if a multi-channel stereo system having more than two channels were introduced, the loudspeaker arrangement of the housing 4 could be used, too, by co-ordinating each loudspeaker to a separate channel. Still, the separation of high and low frequencies makes it possible to use either tweeters or electrostatic louspeakers for the loudspeaker arrangement being incorporated into the housing 4. Since those loudspeakers are much smaller than woofers or multiband loudspeakers, the housing 4 can be very small so as to keep the size of the television set 1 small. In principal, however, the loudspeaker arrangement od the housing 4 can either be suplied with signals including all frequencies of the signal received by the tuner of the television set 1 or by the medium and high frequencies only. It is advantageous to supply the loudspeaker arrangement of housing 4 with those frequencies which are responsible for the stereo effect, whereas the loudspeaker in the housing 3 is supplied with lower frequencies which are not relevant with respect to the stereo effect. Consequently, the loudspeaker of the housing 3 should be a woofer and a medium-range loudspeaker only.

Figure 2:
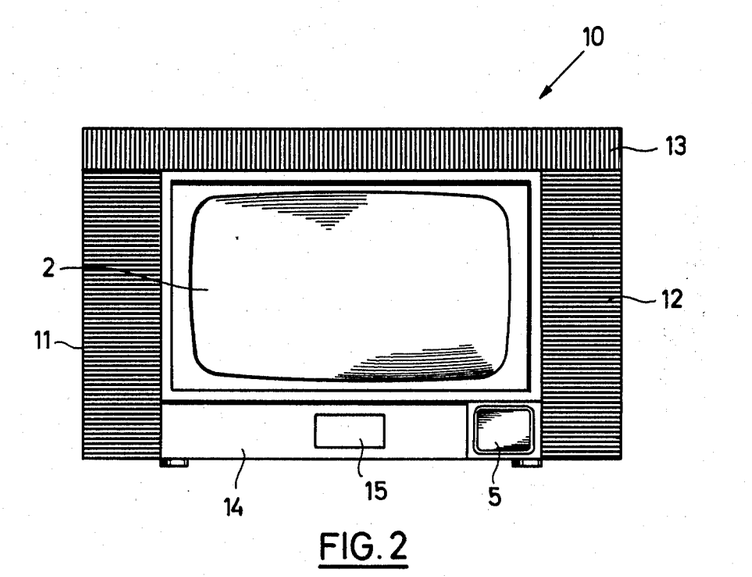
FIG. 2 is a television set having a loudspeaker at the right side of the television tube, and loudspeaker reproducing the right channel stereo signal, this television set also having a loudspeaker at the left side of the television set, said latter loudspeaker reproducing a left channel stereo signal; and the television set also having a loudspeaker arrangement comprising a plurality of loudspeakers at the top of the television set.

FIG. 2 depicts another television set 10 comprising two lateral loudspeakers housing 11,12 and one to loudspeaker arrangement housing 13. The television set 10 also comprises the remote control device 5 and a video tape recorder 14 including a drawer 15 as it is known in the Hifi audio cassette recorder art. The housing 13 of the loudspeaker arrangement is located symmetrically above the television tube 2 and rests with its ends on the housings 11,12, respectively. The two loudspeakers of the housings 11,12 may be supplied conventionally with left and right channel stereo signals. It is also possible, however, to supply these loudspeakers with mono audio signals. The loudspeaker arrangement of the housing 13 is connected to the left and right channel stereo signals as described in connection with FIG. 1. The loudspeakers of the housings 11,12 as well as the loudspeaker arrangement of the housing 13 may be either supplied with all frequencies of the audio band or with a limited frequency band only. The housing 13 of FIG. 2 is especially useful as an additional device for a conventional stereo television set. If, for instance, a television set comprising a television tube 2 and two stereo loudspeakers in the housings 11 and 12 is bought by a person, this set—which is, for instance, standard in Japan—can be improved by buying an additional device comprising a loudspeaker arrangement together with a corresponding electronic circuit. This additional device may be incorporated in the housing 13 and this housing 13 can be laid upon the television set. Thus, the housing 13 may be bought as an isolated device and added to an existing conventional stereo television set. The same would, of course, be possible with respect to a television set as shown in FIG. 1.

Figure 3:
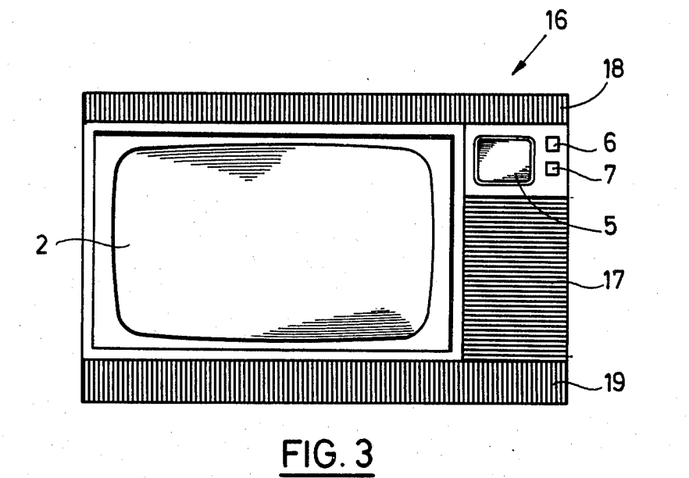
FIG. 3 is a television set similar to the set shown in FIG. 1, but comprising two loudspeaker arrangements, one at the top of the set and the other at the bottom of the set.

FIG. 3 depicts another television set 16 comprising one mono loudspeaker in the housing 17 and two stereo loudspeaker arrangements in the housings 18 and 19, respectively. The housing 18 is located above the television tube 2, whereas the housing 19 is located below the television tube 2. By using two stereo loudspeaker arrangements the acoustical wavefront is enlarged with respect to the vertical direction, thus creating a good stereo sound for the listener in a sitting as well as in a standing position.

Figure 4:
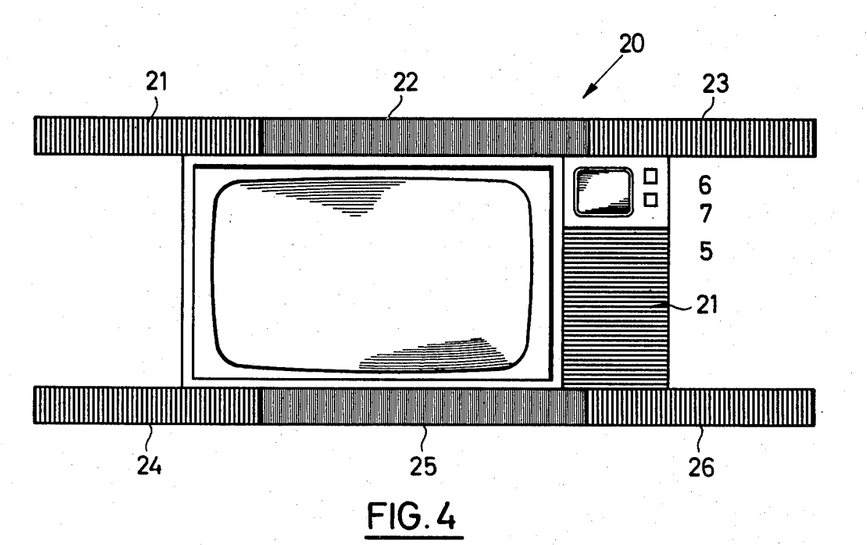
FIG. 4 is a television set similar to the set shown in FIG. 3, but comprising mechanically enlargeable loudspeaker arrangements.

FIG. 4 illustrates another television set 20 comprising one more loudspeaker 21 and two stereo loudspeaker arrangements being incorporated in three housing sections 21,22,23 and 24,25,26, respectively. The left and right housing sections 21,23 and 24,26, respectively, can be displaced with regard to the middle sections 22,25, respectively. When in their initial position, the lateral sections 21,23 and 24,26 will cover the middle sections, respectively; i.e. the television set 20 will then have an outer appearance similar to that of the television set 16 shown in FIG. 3. In their position shown in FIG. 4, the lateral sections 21,23 and 24,26 are drawn from the sections 22,25, respectively. These lateral sections 21,23;24,26 are slidingly connected to the upper part of the television set and located in front of the stationary sections 22,25 to which they may also be slidingly connected. Thus, they can easily be moved horizontally from a position shown in FIG. 3 to a position shown in FIG. 4. Instead of a sliding connection a collapsible connection is also possible; i.e. the lateral sections 21,23,24,26 can be connected by pins or screws to the television set or to the middle sections 22,25 so that their outer ends may be tilted from their position shown in FIG. 4 upwardly and then brought into a position in the middle of the sections 22,25.

Figure 5:
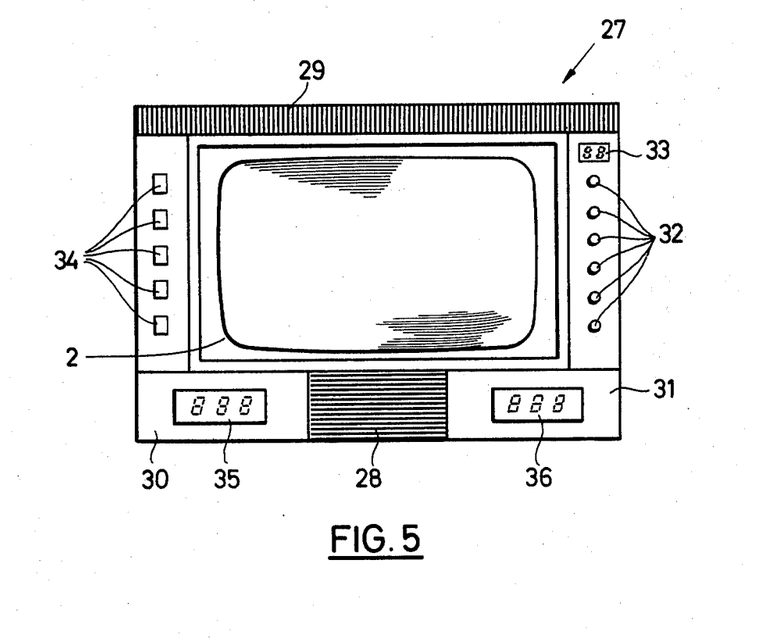
FIG. 5 is a television set comprising two loudspeakers as well as a video tape recorder and a disc record player, both loudspeakers being connected to delay means being capable of delaying the audio signals fed to the loudspeakers.

FIG. 5 illustrates another television set 27 comprising a television tube 2, a mono loudspeaker 28, a stereo loudspeaker arrangement housing 29, a video tape recorder 30 and a video disc recorder player 31. Moreover, the television set comprises several pushbuttons 32 for selecting programs, a display 33 for indicating the selected program and several touch sensor plates 34 for actuating the tape recorder 30 as well as the disc record player 31. The video tape recorder 30 may be of any kind known in the art. A display unit 35 indicates the exakt position of the tape in centimeters, inches or the like. A similar display unit 36 is provided for the video disc record player 31 which may be a player with mechanical, optical, electrical or magnetical disc scanning. Both displays 35, 36 are provided at the front of a drawer as described in connection with FIG. 2.

The loudspeaker arrangement in the housing 29 is connected to left channel and right channel stereo signals as described in connection with FIGS. 1 and 2. The signal being supplied to the mono loudspeaker in the housing 28, however, is delayed as described in German Pat. No. 1,000,865 so as to achieve that the sound waves of the stereo loudspeaker arrangement in housing 29 arrive at an earlier moment at the ears of a listener than the corresponding sound waves being emitted by the mono loudspeaker in the housing 28. The delay time is such that the sound of the stereo loudspeaker arrives earlier at any point of the listening area without causing an echo-effect.

Figure 6:
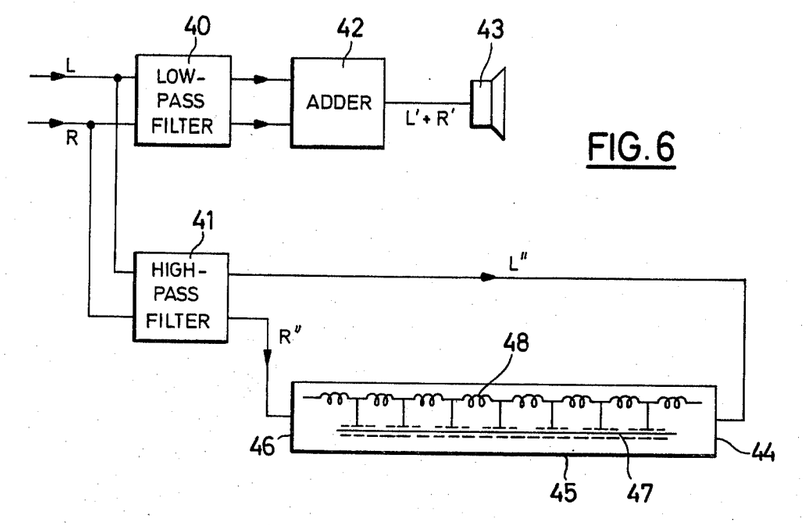
FIG. 6 is a block diagram of a circuit being capable of supplying the loudspeaker system of the television set shown in FIG. 1.

FIG. 6 depicts a circuit being capable of supplying a television set as shown in FIG. 1 with stereo and mono signals. The left channel stereo signal L and the right channel signal R which may be derived from a tuner not shown are led to a low-pass filter 40 as well as to a high-pass filter 41. Having passed the low-pass filter 40, both the L- and the R-signal are added by an adder 42. The resulting sum signal L'+R' which is a mono signal is supplied to a loudspeaker 43 which is, for instance, enclosed by the loudspeaker housing 3 of the television set in FIG. 1.

When the L- and R-signals have passed the high-pass filter 41, the left channel signal L'' is led to the one end 44 of the loudspeaker arrangement 45, whereas the R-signal R''-signal is led to the other end 46 of the loudspeaker arrangement 45. The loudspeaker arrangement 45 comprises an electrostatic loudspeaker 47 being connected to a delay device 48 as described in "Wireless World, August 1955".

Figure 7:
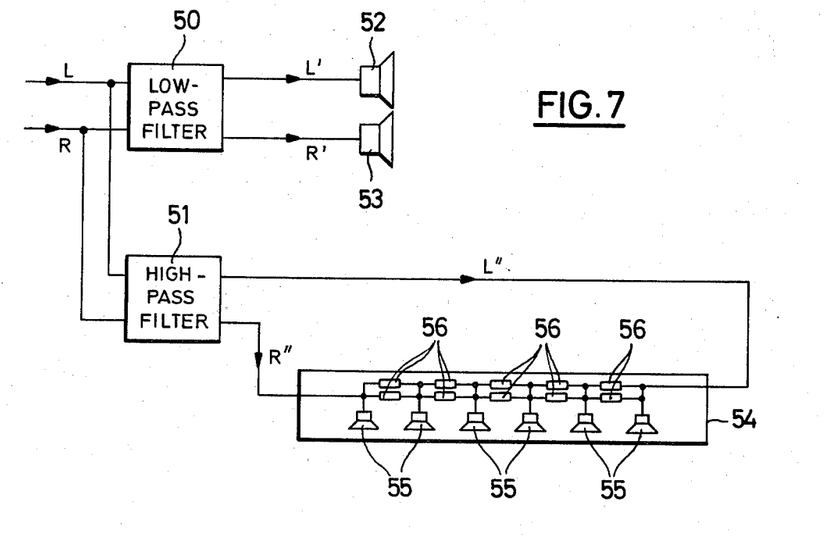
FIG. 7 is a block diagram of a circuit being capable of supplying the loudspeaker system of the television set shown in FIG. 2 with signals.

FIG. 7 depicts another circuit being capable of supplying the television set of FIG. 2 with audio signals. The left and right channel signals L and R are again treated by a low-pass filter as well as by a high-pass filter 50 and 51. The left channel output L' of the low-pass filter 50 is led to a first loudspeaker 52 which may be located in the housing 11 (FIG. 2), and the right channel output R' is fed to a second loudspeaker 53 which may be located in the housing 12 (FIG. 2). The audio signals passing the high-pass filter 51 are led to a loudspeaker arrangement 54 comprising a plurality of dynamic loudspeaker elements 55 and electronic delay elements 56'' e.g. bucket chain delay elements. The details of the device 54 being located in the housing 13 are known in the art and will be more apparent from FIG. 9.

Figure 8:
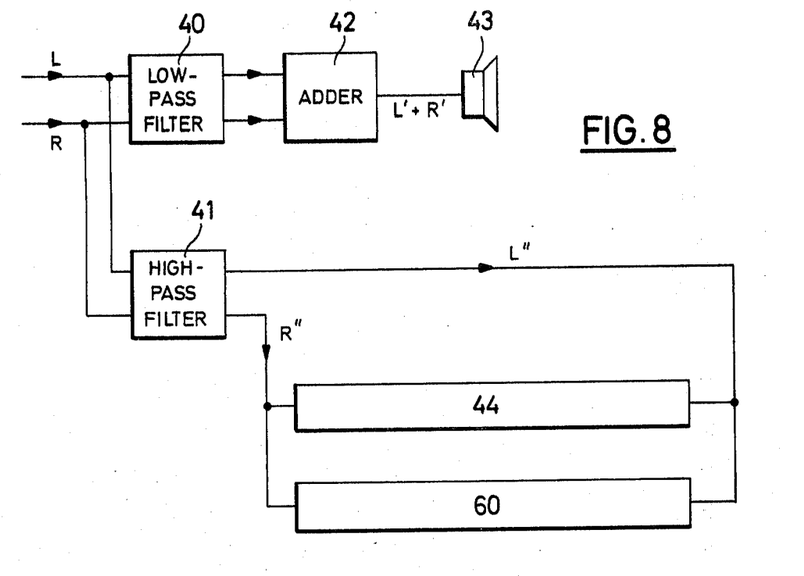
FIG. 8 is a block diagram of a circuit being capable of supplying the loudspeaker system of the television set shown in FIG. 3 with audio signals.

FIG. 8 illustrates a circuit being capable of supplying the television set shown in FIG. 3 with mono and stereo signals. The difference between the circuit of FIG. 6 and the circuit of FIG. 8 is characterized by a second loudspeaker arrangement 60 being located in the housing 19 of the television set 16. The loudspeaker arrangements may either include electrostatic or electrodynamic loudspeaker elements.

Figure 9:
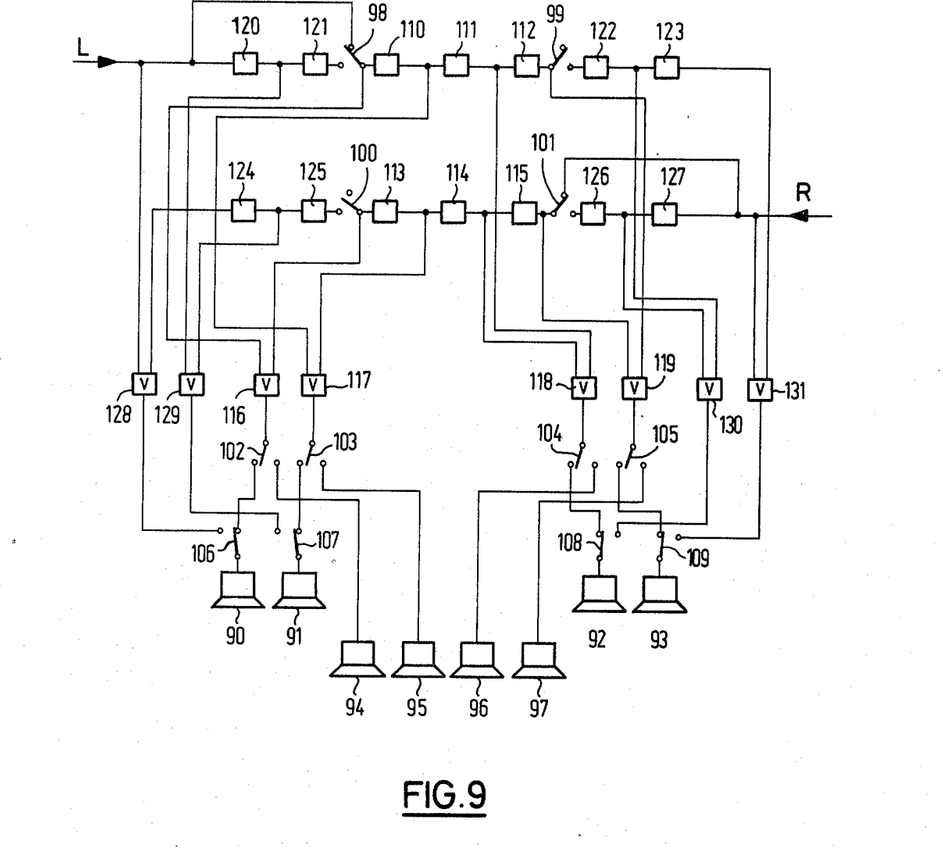
FIG. 9 is a block diagram of a circuit being capable of supplying the loudspeaker system of the television set shown in FIG. 4 with audio signals in at least two different positions of the loudspeakers.

FIG. 9 depicts a circuit being capable of supplying the television set 20 shown in FIG. 4 with mono and stereo audio signals. For an easier understanding the circuit for one loudspeaker arrangement only is shown, said arrangement comprising the sections 21,22,13 in FIG. 4. The loudspeakers 90,91 are located in the housing 21, and the loudspeakers 92,93 are located in the housing 23, whereas the loudspeakers 94-97 are located in the housing 22. If the loudspeaker housings 21,23 are pushed together so as to form a television set shown in FIG. 3, only the loudspeakers 90-93 are operated. In this state switches 98-109 are in their position shown in FIG. 9. Thus, only the delay elements 110-115 and the sum amplifiers 116-119 are operated. Now, if the loudspeaker housings 21,23 are brought into their position illustrated by FIG. 4, switches 98-109 are switched into their second state. This can be effected by an mechanical, optical, electrical or magnetic sensing means being provided between the housing 22 and the housings 21,23 or the like, e.g. the housing 22 carries a reed contact at its ends whereas the ends of the housings 21,23 are provided with magnets being capable of switching the reed contact being co-ordinated to the respective magnet. In their second position the switches 98-109 will actuate the delay elements 120 through 127 and the sum amplifiers 128-131, too. The sum amplifiers 116-119 are now connected to the loudspeakers 94-97. Thus, the loudspeakers 94-97 have the functions the loudspeakers 90-93 had before, i.e. they emit sound in a zone or area where the television tube 2 is located.

Figure 10:
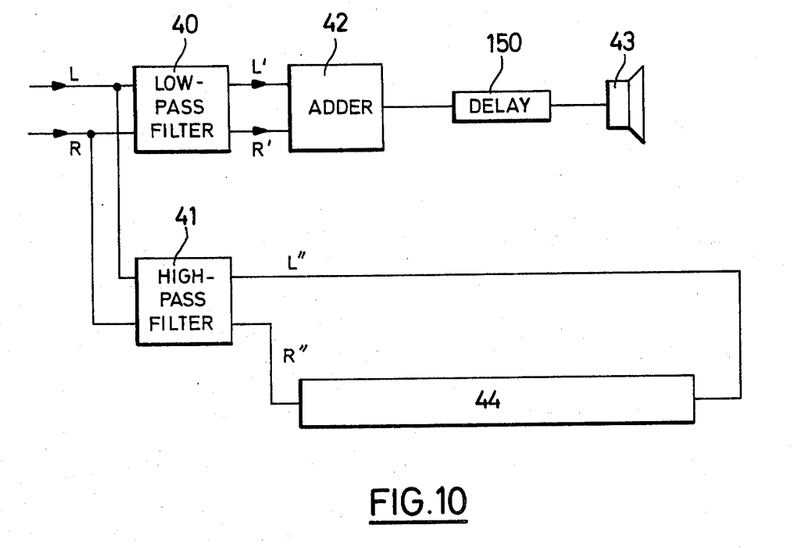
FIG. 10 is a block diagram of a circuit being capable of supplying the two loudspeakers of the television set shown in FIG. 5 with delayed audio signals.

FIG. 10 depicts another circuit being capable of providing the television set shown in FIG. 5 with mono and stereo signals. This circuit corresponds to the circuit of FIG. 6 in principle. There is, however, a delay circuit 150 connected between the loudspeaker 43 and the adder 42, this delay circuit 150 being capable of delaying the audio signal with respect to the audio signals supplied to the loudspeaker arrangement 44. As a result, the sound of the loudspeaker arrangement 44 being responsible for the stereo effect will arrive earlier at the listener's ears than the sound of the loudspeaker 43 not causing a stereo sensation.

Figure 11:
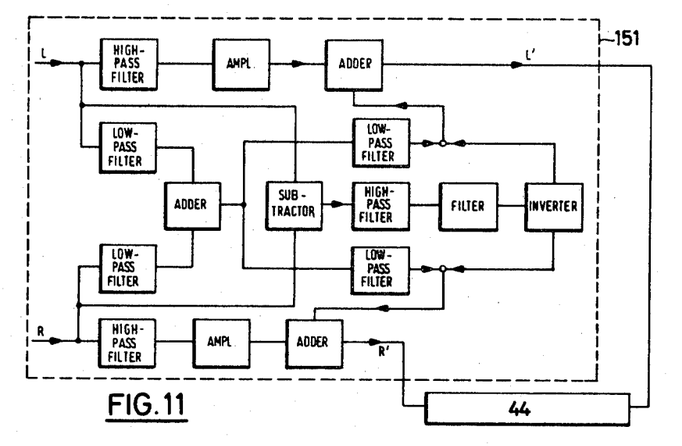
FIG. 11 is a block diagram of a circuit combining a delayed stereo signal device with a device as described in German Auslegeschrift No. 23 55 943.

FIG. 11 depicts a circuit 151 as shown in FIG. 4 of German Auslegeschrift No. 23 55 943 together with a loudspeaker arrangement 44. Thus, FIG. 11 illustrates that the present invention can be combined with a prior art stereo improvement device. The L' and R' signals can, of course, be divided into high and low frequencies and then treated as shown in one of the predescribed embodiments. Therefore, the combination illustrated in FIG. 11 is not the only combination possible with respect to the circuit 151, said circuit being capable of simulating the reflections of acoustic waves at walls.

Figure 12:
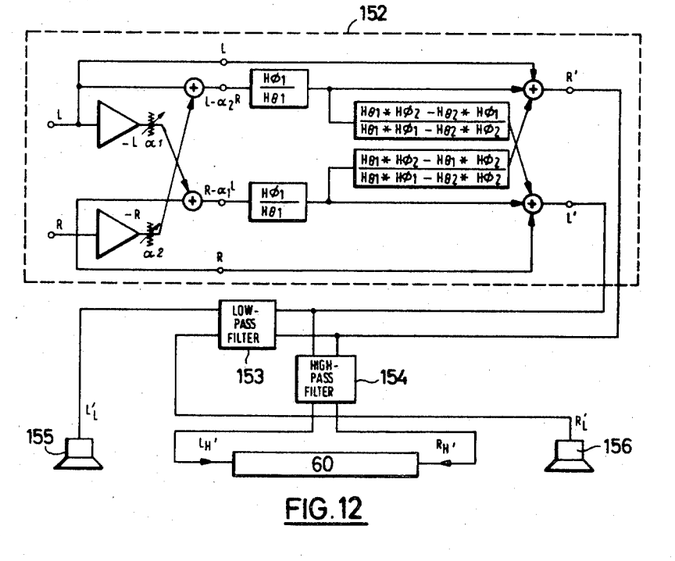
FIG. 12 is a block diagram of a circuit, said circuit combining a delayed stereo signal device with a device as described in German Offenlegungsschrift No. 2806914.

Another stereo sound improvement device 152 as disclosed in FIGS. 11 and 12 of German Offenlegungsschrift No. 28 06 914 is shown in FIG. 12, this device 152 being connected to a low-pass filter 153 as well as to a high-pass filter 154, the low-pass filter supplying two loudspeakers 155 and 156 with left and right channel signals $L_L'$ and $R_L'$, respectively, and the high-pass filter 154 supplying the loudspeaker arrangement 60 with left right channel stereo signals $L_H'$ and $R_H'$, respectively.

While the invention has been illustrated and described as embodied in a television set, it is not intended to be limited to the details shown, since modifications and structural chenges may be made without departing from the spirit of the invention.

What I claim is:

1. A stereo loudspeaker system for a picture reproducing screen, said loudspeaker system comprising:
(a) at least one loudspeaker arrangement being arranged on a horizontal axis with respect to the screen, said arrangement comprising a plurality of loudspeaker units which are distributed from at least the left end to at least the right end of the screen, the one end of said loudspeaker arrangement being supplied with right channel stereo signals and the other end being supplied with left channel stereo signals;
(b) a circuit for successively delaying the right channel stereo signal and the left channel stereo signal from one loudspeaker unit to the other in such a manner that the loudspeaker unit at the one end of the loudspeaker arrangement receives the least delayed right channel stereo signal as well as the most delayed left channel stereo signal, whereas the loudspeaker unit at the other end of the loudspeaker arrangement receives the least delayed left channel signal as well as the most delayed right channel signal.

2. Stereo loudspeaker system as defined in claim 1, wherein the loudspeaker arrangement is arranged above the screen.

3. Stereo loudspeaker system as defined in claim 1, wherein the loudspeaker arrangement is arranged below the screen.

4. Stereo loudspeaker system as defined in claim 1, wherein the screen is the front side of a television tube.

5. Stereo loudspeaker system as defined in claim 1, wherein an additional loudspeaker is provided, said additional loudspeaker being arranged at the right side of the screen.

6. Stereo loudspeaker system as defined in claim 1, wherein an additional loudspeaker is provided, said additional loudspeaker being arranged at the left side of the screen.

7. Stereo loudspeaker system as defined in claim 1, wherein two additional loudspeakers are provided, one of these additional loudspeakers being arranged at the left side of the screen and the other being arranged at the right side of the screen.

8. Stereo loudspeaker system as defined in claim 1, wherein the length of the loudspeaker arrangement is variable.

9. Stereo loudspeaker system as defined in claim 1, wherein the loudspeaker arrangement is arranged above the screen and wherein an additional loudspeaker is arranged below the screen, the additional loudspeaker being bounded at its left and right side by means being capable of reproducing stored information.

10. Stereo loudspeaker system as defined in claim 9, wherein the screen is a television tube and wherein the one of the means being capable of reproducing stored information is a video tape recorder, whereas the other of said means is a video recorder player, both means being an integral part of a television set comprising a television tube and two loudspeakers.

11. Stereo loudspeaker system as defined in claim 1, further comprising: a low-pass filter, a high-pass filter; an adder; and an additional loudspeaker; wherein the left and right channel stereo signals are supplied to the low-pass filter as well as to the high-pass filter and wherein the signals passing the low-pass filter are supplied through the adder to the additional loudspeaker, whereas the stereo signals passing the high-pass filter are supplied to the loudspeaker arrangement.

12. Stereo loudspeaker system as defined in claim 1, further comprising: a low-pass filter; a high-pass filter; a first additional loudspeaker; and a second additional loudspeaker; wherein the left and right channel stereo signals are supplied to the low-pass filter as well as to the high-pass filter and wherein the left channel stereo signal passing the low-pass filter is supplied to the first additional loudspeaker and wherein the right channel signal passing the low-pass filter is supplied to the second additional loudspeaker, whereas the stereo signals passing the high-pass filter are supplied to the loudspeaker arrangement.

13. Stereo loudspeaker system as defined in claim 1, wherein the loudspeaker arrangement comprises at least four electrodynamic loudspeakers.

14. Stereo loudspeaker system as defined in claim 13, wherein the electrodynamic loudspeakers are tweeters.

15. Stereo loudspeaker system as defined in claim 1, wherein the loudspeaker arrangement is an electrostatic loudspeaker comprising a plurality of sound emitting elements.

16. Stereo loudspeaker system as defined in claim 9, wherein the loudspeaker arrangement comprises three sections, each section including a plurality of loudspeaker elements and two sections being in front of the third part, said latter two parts being removable from each other.

17. Stereo loudspeaker system as defined in claim 16, wherein said three sections are, in dependence upon their respective position, connectable to different delay elements of a delay circuit.

18. Stereo loudspeaker system as defined in claim 9, further comprising a sound improving circuit, wherein the right and left channel stereo signals are supplied through the sound improving circuit to the loudspeaker arrangement, said sound improving circuit comprising means for adding signals to the original sound signals by taking into consideration the distortion of a direct sound by the reflected sound.

19. Stereo loudspeaker system as defined in claim 9, further comprising a sound improving circuit, wherein the right and left channel stereo signals are supplied through the sound improving circuit to the loudspeaker arrangement, said sound improving circuit comprising means for influencing the original left and right channel signal in such a manner that the signals received by a listener are more plastic with respect to depth recognition as well as with respect to the recognition of the angle of the source of the sound.

20. Stereo loudspeaker systems as defined in claim 1, wherein the loudspeaker arrangement is located above the screen and wherein an additional loudspeaker and additional delaying means are provided, said additional delaying means being connected to said additional loudspeaker and delaying the audio signal for a greater amount than the delay means being connected to the loudspeaker arrangement.

* * * * *